(12) United States Patent
Nishida

(10) Patent No.: US 8,482,711 B2
(45) Date of Patent: Jul. 9, 2013

(54) IN-PLANE SWITCHING LIQUID CRYSTAL DISPLAY DEVICE HAVING REFLECTIVE REGION AND TRANSMISSIVE REGION

(75) Inventor: Kenji Nishida, Otsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/370,376

(22) Filed: Feb. 10, 2012

(65) Prior Publication Data

US 2013/0038825 A1 Feb. 14, 2013

Related U.S. Application Data

(62) Division of application No. 12/373,983, filed as application No. PCT/JP2007/056654 on Mar. 28, 2007, now Pat. No. 8,208,102.

(30) Foreign Application Priority Data

Jul. 21, 2006 (JP) .................................. 2006-199667

(51) Int. Cl.
*G02F 1/1335* (2006.01)
*G02F 1/1343* (2006.01)

(52) U.S. Cl.
USPC .......................................... 349/141; 349/114

(58) Field of Classification Search
USPC ................................................ 349/114, 141
See application file for complete search history.

(56) References Cited

U.S. PATENT DOCUMENTS

| | | | |
|---|---|---|---|
| 6,111,626 A | 8/2000 | Watanabe et al. |
| 6,281,952 B1 | 8/2001 | Okamoto |
| 6,538,713 B1 | 3/2003 | Yanagawa et al. |
| 7,088,409 B2 | 8/2006 | Itou et al. |
| 8,208,102 B2 | 6/2012 | Nishida |
| 2001/0052948 A1 | 12/2001 | Okamoto et al. |
| 2003/0123012 A1 | 7/2003 | Yanagawa |
| 2003/0218664 A1 | 11/2003 | Sakamoto et al. |
| 2005/0083462 A1 | 4/2005 | Lin |
| 2005/0105033 A1 | 5/2005 | Itou |
| 2005/0128407 A1 | 6/2005 | Lee et al. |
| 2005/0140620 A1 | 6/2005 | Aoyama et al. |
| 2005/0157239 A1 | 7/2005 | Yoo |

(Continued)

FOREIGN PATENT DOCUMENTS

| | | |
|---|---|---|
| CN | 1603915 A | 4/2005 |
| EP | 1 744 205 | 1/2007 |

(Continued)

OTHER PUBLICATIONS

U.S. Appl. No. 12/373,983, filed Jan. 15, 2009; Nishida.

(Continued)

*Primary Examiner* — Lauren Nguyen
(74) *Attorney, Agent, or Firm* — Nixon & Vanderhye P.C.

(57) ABSTRACT

A display device includes a pair of substrates, a display medium interposed between the pair of substrates, and a pixel including a reflective region for performing reflective display and a transmissive region for performing transmissive display. A voltage is applied to the display medium through at least a pixel electrode and a common electrode, at least one the pixel electrode and the common electrode being provided with a slit. The pixel electrode can be provided with the slit in at least the reflective region, and the common electrode is provided with the slit in the reflective region and/or the transmissive region.

20 Claims, 6 Drawing Sheets

U.S. PATENT DOCUMENTS

| | | | |
|---|---|---|---|
| 2005/0213013 A1 | 9/2005 | Chen et al. | |
| 2005/0243251 A1 | 11/2005 | Yang et al. | |
| 2005/0253989 A1 | 11/2005 | Chen et al. | |
| 2005/0264720 A1* | 12/2005 | Itou et al. | 349/99 |
| 2006/0050385 A1 | 3/2006 | Uehara | |
| 2006/0092363 A1 | 5/2006 | Hasegawa et al. | |
| 2006/0268206 A1 | 11/2006 | Nishimura | |
| 2007/0013835 A1 | 1/2007 | Matsushima et al. | |
| 2007/0040978 A1 | 2/2007 | Nakayoshi et al. | |
| 2007/0109455 A1 | 5/2007 | Kim et al. | |
| 2007/0165171 A1 | 7/2007 | Lee | |
| 2009/0201449 A1 | 8/2009 | Nishida | |
| 2009/0207366 A1 | 8/2009 | Kim | |
| 2009/0225261 A1 | 9/2009 | Hasegawa et al. | |
| 2009/0262286 A1 | 10/2009 | Nishida | |
| 2009/0262287 A1 | 10/2009 | Nishida | |

FOREIGN PATENT DOCUMENTS

| | | |
|---|---|---|
| EP | 1 912 093 | 4/2008 |
| JP | 11-174493 A | 7/1999 |
| JP | 11-242226 | 9/1999 |
| JP | 2000-305097 A | 11/2000 |
| JP | 2001-166321 A | 6/2001 |
| JP | 2003-149664 | 5/2003 |
| JP | 2005-106967 | 4/2005 |
| JP | 2005-208567 | 8/2005 |
| JP | 2005-338264 | 12/2005 |
| JP | 2006-126602 A | 5/2006 |
| JP | 2006-184325 A | 7/2006 |
| JP | 2007-004125 | 1/2007 |
| JP | 2007-047734 | 2/2007 |
| JP | 2007-058007 | 3/2007 |
| JP | 2007-183585 A | 7/2007 |
| WO | 2005/006068 A | 1/2005 |

OTHER PUBLICATIONS

Notice of Allowance for U.S. Appl. No. 12/307,639 mailed Dec. 9, 2011; Nishida.
Office Action for U.S. Appl. No. 12/375,246 mailed Dec. 1, 2011; Nishida.
Election Requirement for U.S. Appl. No. 12/375,246 mailed Aug. 30, 2011; Nishida.
Office Action for U.S. Appl. No. 12/307,639 mailed Jun. 7, 2011; Nishida.
Lim et al, "A Single Gap Transflective Display with Single Gamma Curve in the Fringe Field Switching Mode", Japanese Journal of Applied Physics, Japan Society of Applied Physics, Tokyo, JP, vol. 44, No. 50, Jan. 1, 2005, pp. L1532-L1534.
EP Supplementary Search Report mailed Jul. 27, 2009 in corresponding EP application 07740092.7.
EP Supplementary Search Report mailed Jul. 27, 2009 in corresponding EP application 09001552.0.
U.S. Appl. No. 12/307,639, filed Jan. 6, 2009; Nishida.
U.S. Appl. No. 12/375,246, filed Jan. 27, 2009; Nishida.
International Search Report for PCT/JP2007/056658, mailed Jun. 5, 2007.
JP Office Action mailed Oct. 6, 2009 in corresponding JP application 2008-525796.
JP Office Action mailed Oct. 6, 2009 in corresponding JP application 2008-279551.
International Search Report for PCT/JP2007/056654, mailed Jun. 12, 2007.

* cited by examiner

IN-PLANE SWITCHING LIQUID CRYSTAL DISPLAY DEVICE HAVING REFLECTIVE REGION AND TRANSMISSIVE REGION

This application is a Divisional of Ser. No. 12/373,983, filed Jan. 15, 2009, now U.S. Pat. No. 8,208,102 which is a 371 (national stage) of PCT/JP2007/056654, filed 28 Mar. 2007, which designates the U.S. and claims priority to Japanese Application No. 2006-199667, filed 21 Jul. 2006, the entire contents of each of which are all hereby incorporated by reference.

TECHNICAL FIELD

The present invention relates to a display device. More specifically, the present invention relates to a display device preferably used in a liquid crystal display in accordance with In Plane Switching (IPS) mode or Fringe Field Switching (FFS) mode.

BACKGROUND ART

Display devices such as a liquid crystal display device have been widely used in electronics such as a monitor, a projector, a cellular phone, and a personal digital assistant (PDA). Reflective, transmissive, and transflective display devices are mentioned as a display type of the liquid crystal display devices. Under relatively dark environments such as indoor environment, the transmissive liquid crystal display device which provides display using light from a backlight is mainly used. Under relatively bright environments such as outdoor environment, the reflective liquid crystal display device which provides display using external light is mainly used. The transflective liquid crystal display device can provide both of transmissive display and reflective display, and mainly provides transmissive display under indoor environments and provides reflective display under outdoor environments. Therefore, such a transflective liquid crystal display device can provide display with high qualities under any environments regardless of indoor or outdoor environments, and it has been widely equipped with mobile equipment such as a cellular phone, a PDA, and a digital camera. According to the transflective liquid crystal display device, for example, a Vertical Alignment (VA) mode is used as display mode. The VA mode is a mode in which a liquid crystal molecule is aligned to be vertical to the substrate surface when a voltage is not applied and display is carried out by tilting the liquid crystal molecule by application of a voltage.

However, according to the transflective liquid crystal display device, reflective light passes through the liquid crystal layer twice, but transmissive light passes through the liquid crystal layer only once. Therefore, if a cell gap is designed to be optimal for reflective light, the transmittance of the transmissive light is about ½ of the optimal value. As a solution for this, a method in which the reflective region and the transmissive region are formed to have different cell gaps to form a multi-gap structure, and the thickness of the liquid crystal layer in the reflective region is decreased is mentioned (for example, refer to Patent Document 1). However, this method needs to form irregularities on the substrate, which complicates the structure on the substrate. Further, the production steps of the substrate need to be performed with high accuracy. Therefore, such a method has room for improvement. In addition, there is room for improvement also in that the response time of the liquid crystal molecule is different between the reflective region and the transmissive region.

IPS mode and FFS mode have been known as display mode of the liquid crystal display device, in addition to the VA mode. According to the IPS and FFS modes, liquid crystal is operated by a horizontal electric field generated by a pair of electrodes for driving the liquid crystal, formed on one substrate. According to these systems, the liquid crystal molecule moves in the horizontal direction (in the direction parallel to the substrate), which widens the viewing angle. A transflective liquid crystal display device in IPS mode is disclosed (for example, refer to Patent Document 2). This device in IPS mode also has a multi-gap structure, and it fails to solve the above-mentioned problems.
[Patent Document 1]
Japanese Kokai Publication No. Hei-11-242
[Patent Document 2]
Japanese Kokai Publication No. 2005-338264

DISCLOSURE OF INVENTION

The present invention has been made in view of the above-mentioned state of the art. The present invention has an object to provide a display device which can provide bright display by both of reflective display and transmissive display without having a multi-gap structure and which can reduce a difference in response time between the reflective region and the transmissive region.

The present inventor made various investigations on a display device which can provide bright display by both of reflective display and transmissive display without having a multi-gap structure. The inventor noted an arrangement relationship between a pixel electrode and a common electrode in the reflective region and the transmissive region. The inventor found the followings. If, in the horizontal electric field mode such as IPS mode and FFS mode, each of the pixel electrode and the common electrode is provided with a slit; the pixel electrode is provided with the slit in the reflective region and the transmissive region; and the common electrode is provided with the slit substantially only in the reflective region, an intensity of the electric field generated between the pixel electrode and the common electrode in the reflective region can be made smaller than that in the transmissive region without forming the multi-gap structure. As a result, light use efficiency in the reflective display and the transmissive display can be adjusted. As a result, the above-mentioned problems have been admirably solved, leading to completion of the present invention.

That is, the present invention is a display device including: a pair of substrates; a display medium interposed between the pair of substrates; and a pixel having a reflective region for performing reflective display and a transmissive region for performing transmissive display, wherein the display device includes a pixel electrode and a common electrode on one of the pair of substrates, a voltage is applied to the display medium through the pixel electrode and the common electrode, each of the pixel electrode and the common electrode is provided with a slit, the pixel electrode is provided with the slit in the reflective region and the transmissive region, and the common electrode is provided with the slit in the reflective region (hereinafter, also referred to as the first display device)

The present invention is mentioned in more detail below.

The first display device of the present invention includes a pair of substrates, a display medium interposed between the pair of substrates, and a pixel having a reflective region for performing reflective display and a transmissive region for performing transmissive display. In the present invention, the kinds of the substrate and the display medium are not especially limited. For example, according to an active matrix liquid crystal display device, the following embodiment is mentioned. The active matrix liquid crystal display device includes: an active matrix substrate and a color filter substrate as a pair of substrates; and a liquid crystal layer interposed between these substrates as the display medium, wherein on the active matrix substrate, scanning wirings and signal wirings are arranged to be intersect with each other, and at each intersection, a TFT that is a switching element is arranged, and on the color filter substrate, color layers of red (R), green (G), and blue (B) are arranged in each pixel. The liquid crystal display device generally includes a polarizer, a backlight and the like, outside the substrates. The reflective display is a mode in which display is performed by reflecting light outputted from a front light arranged on the display surface side or external light, inside the display device. The transmissive display is a mode in which display is performed by transmitting light outputted from the backlight. The size of the reflective region and the transmissive region and the proportion of those regions in the pixel are not especially limited. The display device of the present invention is a transflective display device because the reflective region and the transmissive region are arranged in one pixel.

The display device of the present invention includes a pixel electrode and a common electrode on one of the substrates, and a voltage is applied to the display medium through the above-mentioned pixel electrode and the above-mentioned common electrode. If a voltage is applied to the pair of electrodes that is the pixel electrode and the common electrode, a horizontal electric field parallel to the substrate is generated in the display medium near the pixel electrode and the common electrode. This electric field controls the display medium.

In the present invention, each of the pixel electrode and the common electrode is provided with a slit; the pixel electrode is provided with the slit in the reflective region and the transmissive region; and the common electrode is provided with the slit in the reflective region. That is, substantially only in the reflective region, the common electrode is provided with the slit. In this case, the common electrode may be provided with the slit also in the transmissive region as long as the operation and effects of the present invention can be exhibited. Further, an embodiment in which the common electrode is formed over the entire transmissive region is preferable. In the present description, the "common electrode is formed over the entire transmissive region" means that there is no region where the common electrode is not formed on the transmissive region. Thus, according to the display device of the present invention, the pixel electrode and the common electrode are configured in accordance with IPS mode in the reflective region, and in the transmissive region, the pixel electrode and the common electrode are configured in accordance with FFS mode. In the present description, the "IPS mode" means an embodiment in which the slit of the pixel electrode and the slit of the common electrode are arranged to engage with each other. Further, the "FFS mode" means an embodiment in which one of the pixel electrode and the common electrode is provided with the slit and the other is not substantially provided with the slit. If a voltage is applied to such a pair of electrodes that are the pixel electrode and the common electrode, a horizontal electric field is generated between the pixel electrode and the common electrode. This intensity of the electric field is decreased as the distance between the pixel electrode and the common electrode is increased. The distance between the pixel electrode and the common electrode in the region having an IPS mode configuration can be easily increased than that in the region having FFS mode configuration because of the configuration of the liquid crystal display device. Accordingly, the configuration of the pixel electrode and the common electrode in the reflective region is in accordance with IPS mode and that in the transmissive region is in accordance with FFS mode, and thereby the intensity of the electric field generated between the pixel electrode and the common electrode in the reflective region can be made smaller than that of the electric field generated between the pixel electrode and the common electrode in the transmissive region. The alignment degree of the liquid crystal varies depending on the electric field intensity, and therefore, by using this feature, use efficiency of light which passes through the liquid crystal can be adjusted. The shape of the slit of the pixel electrode and the common electrode is not especially limited as long as a certain width is secured. In addition, the pixel electrode and the common electrode are formed in different layers with an insulating film and the like therebetween because one pixel has both of the IPS mode structure and the FFS mode structure.

As a preferable embodiment of the above-mentioned common electrode, an embodiment in which the common electrode has a comb-tooth shape in the reflective region may be mentioned, for example. If the common electrode has a comb-tooth shape, a high-density horizontal electric field can be generated between the pixel electrode and the common electrode, and hence, the display medium can be controlled with high accuracy.

The following embodiments are mentioned as a preferable embodiment of a slit provided for the common electrode. An embodiment in which the slit of the common electrode is entirely surrounded by the common electrode; an embodiment in which the slit of the common electrode has a rectangular shape; an embodiment in which the slit of the common electrode has a rectangular shape having one bent part; an embodiment in which the slit of the common electrode has a zig-zag shape; an embodiment in which the slit of the common electrode has a circular arc shape; and an embodiment in which the slit of the common electrode has a meandering shape. According to such embodiments, a high-density horizontal electric field can be generated between the pixel electrode and the common electrode, and hence, the display medium can be controlled with high accuracy.

As a preferable embodiment of the above-mentioned pixel electrode, an embodiment in which the pixel electrode has a comb-tooth shape may be mentioned, for example. Similarly to the above-mentioned common electrode, if the pixel electrode has a comb-tooth shape, a high-density horizontal electric field can be generated, and hence, the display medium can be controlled with high accuracy.

The following embodiments are mentioned as a preferable embodiment of a slit provided for the pixel electrode. An embodiment in which the slit of the pixel electrode is entirely surrounded by the pixel electrode; an embodiment in which the slit of the pixel electrode has a rectangular shape; an embodiment in which the slit of the pixel electrode has a rectangular shape having one bent part; an embodiment in which the slit of the pixel electrode has a zig-zag shape; an embodiment in which the slit of the pixel electrode has a circular arc shape; and an embodiment in which the slit of the pixel electrode has a meandering shape. According to such embodiments, a high-density horizontal electric field can be generated, similarly to the above-mentioned common electrode, and hence, the display medium can be controlled with high accuracy.

As another preferable embodiment of the above-mentioned slit provided for the pixel electrode, an embodiment in which the slit of the pixel electrode has substantially the same shape as a shape of the slit of the common electrode. According to such an embodiment, the intensity of the electric field generated at each part where the slit of the common electrode is engaged with the slit of the pixel electrode can be made uniform and as a result, alignment of the liquid crystal can be uniformly controlled. In the present embodiment, the term "the same" means that the same enough to uniform substantially the electric field intensity generated at each part (unless display qualities are influenced), that is, substantially the same.

As another preferable embodiment of the above-mentioned slit provided for the pixel electrode, an embodiment in which a width of the slit of the pixel electrode in the reflective region is larger than a width of the slit of the pixel electrode in the transmissive region is mentioned. The intensity of the electric field generated between the pixel electrode and the common electrode can be decreased also by increasing the distance between the pixel electrode and the common electrode. Thus, if this embodiment is adopted in combination with the embodiment of the present invention, the intensity of the electric field generated between the pixel electrode and the common electrode in the reflective region can be more effectively made smaller than that in the transmissive region.

An embodiment in which a shield electrode is arranged between the pixel electrode and the common electrode in the reflective region is mentioned as a preferable embodiment of the first display device. In the present description, the "shield electrode" means an electrode which is positioned between the pixel electrode and the common electrode to change a difference in electric potential between the pixel electrode and the common electrode. Due to the shield electrode arranged between the pixel electrode and the common electrode, the electric potential difference generated between the pixel electrode and the common electrode is smaller than that in the case that no shield electrode is arranged. If this embodiment is adopted in combination with the embodiment of the present invention, the intensity of the electric field generated between the pixel electrode and the common electrode in the reflective region can be more effectively made smaller than that in the transmissive region. The material for the shield electrode is not especially limited as long as it has conductivity. A transparent material is particularly preferable. A metal oxide such as indium tin oxide (ITO) is preferably used. The size and shape of the shield electrode are not especially limited as long as it can be arranged between the pixel electrode and the common electrode.

It is preferable that the shield electrode is connected to ground. If the shield electrode is connected to ground, a voltage applied to the shield electrode can be maintained at 0V. Further, if the shield electrode is connected to ground and thereby an electric potential of the shield electrode is 0V, an electric potential difference between the pixel electrode and the common electrode can be effectively decreased.

The present invention is also a display device including: a pair of substrates; a display medium interposed between the pair of substrates; and a pixel having a reflective region for performing reflective display and a transmissive region for performing transmissive display, wherein the display device includes a pixel electrode and a common electrode on one of the pair of substrates, a voltage is applied to the display medium through the pixel electrode and the common electrode, each of the pixel electrode and the common electrode is provided with a slit, the pixel electrode is provided with the slit in the reflective region, and the common electrode is provided with the slit in the reflective region and the transmissive region (hereinafter, also referred to as the second display device). Thus, the second display device of the present invention, in which the common electrode is provided with a slit in both of the reflective region and the transmissive region and the pixel electrode is provided with a slit substantially only in the reflective region can exhibit the same effects as in the first display device of the present invention, in which the pixel electrode is provided with a slit in both of the reflective region and the transmissive region and the common electrode is provided with a slit substantially only in the reflective region. Also in the second display device of the present invention, it is preferable that the pixel electrode is formed over the entire transmissive region. The shape of the slit of the pixel electrode and the common electrode is not especially limited as long as a certain width is secured. In addition, the pixel electrode and the common electrode are formed in different layers with an insulating film and the like therebetween because one pixel has both of the IPS mode structure and the FFS mode structure.

As a preferable embodiment of the above-mentioned pixel electrode, an embodiment in which the pixel electrode has a comb-tooth shape in the reflective region may be mentioned, for example. Further, the following embodiments are mentioned as a preferable embodiment of a slit provided for the pixel electrode. An embodiment in which the slit of the pixel electrode is entirely surrounded by the pixel electrode; an embodiment in which the slit of the pixel electrode has a rectangular shape; an embodiment in which the slit of the pixel electrode has a rectangular shape having one bent part; an embodiment in which the slit of the pixel electrode has a zig-zag shape; an embodiment in which the slit of the pixel electrode has a circular arc shape; and an embodiment in which the slit of the pixel electrode has a meandering shape.

Further, as a preferable embodiment of the above-mentioned common electrode, an embodiment in which the common electrode has a comb-tooth shape may be mentioned, for example. Further, the following embodiments are mentioned as a preferable embodiment of a slit provided for the common electrode. An embodiment in which the slit of the common electrode is entirely surrounded by the common electrode; an embodiment in which the slit of the common electrode has a rectangular shape; an embodiment in which the slit of the common electrode has a rectangular shape having one bent part; an embodiment in which the slit of the common electrode has a zig-zag shape; an embodiment in which the slit of the common electrode has a circular arc shape; and an embodiment in which the slit of the common electrode has a meandering shape. Thus, the preferable embodiments of the second display device of the present invention are mentioned. These embodiments are not mentioned in more detail because, in these embodiments, the common electrode and the pixel electrode in the preferable embodiments of the first display device of the present invention are just replaced with the pixel electrode and the common electrode, respectively.

As a preferable embodiment of the above-mentioned slit provided for the common electrode, an embodiment in which the slit of the common electrode has substantially the same shape as a shape of the slit of the pixel electrode. According to such an embodiment, the intensity of the electric field generated at each part where the slit of the common electrode is engaged with the slit of the pixel electrode can be made uniform and as a result, alignment of the liquid crystal can be uniformly controlled.

As a preferable embodiment of the above-mentioned slit provided for the common electrode, an embodiment in which a width of the slit of the common electrode in the reflective region is larger than a width of the slit of the common electrode in the transmissive region is mentioned. According to such an embodiment, the intensity of the electric field generated between the pixel electrode and the common electrode in the reflective region can be more effectively made smaller than that in the transmissive region, similarly to the first display device of the present invention.

An embodiment in which a shield electrode is arranged between the pixel electrode and the common electrode in the reflective region is mentioned as a preferable embodiment of the second display device. According to such an embodiment, the intensity of the electric field generated between the pixel electrode and the common electrode in the reflective region can be more effectively made smaller than that in the transmissive region, similarly to the first display device of the present invention. Further, it is preferable that the shield electrode is connected to ground. According to such an embodiment, the voltage adjustment can be more easily performed.

Effect of the Invention

The display device of the present invention can provide bright display by both of the reflective display and the transmissive display without having a multi-gap structure. In addition, because of the absence of the multi-gap structure, the difference in response time of the liquid crystal molecule between the reflective region and the transmissive region can be decreased.

BEST MODES FOR CARRYING OUT THE INVENTION

The present invention is mentioned in more detail below with reference to the following Embodiments, but the present invention is not limited to only these Embodiments.

Embodiment 1

Embodiment 1 shows a liquid crystal display device in accordance with one embodiment of the first display device of the present invention. FIG. 1 is a planar view schematically showing one pixel constituting the liquid crystal display device in Embodiment 1. FIG. 2 is a schematic view showing a cross section taken along dashed line A-B in FIG. 1. The liquid crystal display device in accordance with Embodiment 1 includes the first substrate 1, the second substrate 2, and a liquid crystal layer 3 interposed between these substrates, as shown in FIG. 2. The second substrate 2 includes a pixel electrode 4 and a common electrode 5, and a voltage is applied to the liquid crystal layer 3 through the pixel electrode 4 and the common electrode 5.

The first substrate 1 includes a color filter layer 6 and the first alignment film 7 on the liquid crystal layer 3 side in this order. A glass substrate can be used as the first substrate 1, for example. The color filter layer 6 includes red, green, and blue regions which are arranged in a repeating pattern. The color filter layer 6 may be composed of regions of four or more colors. Irregularities attributed to the color filter layer 6 may be flattened by a resin layer for flattening, and the like. The first alignment film 7 determines an alignment direction of the liquid crystal layer 3 near the first alignment film 7.

The second substrate 2 includes a scanning wiring 8, a common wiring (reflector) 9, the first insulating layer 10, a signal wiring 11, a thin film transistor 12, the second insulating layer 13, a common electrode 5, and the third insulating layer 15 on the liquid crystal layer 3 side, and further includes the pixel electrode 4 and the second alignment film 16 on the liquid crystal layer 3 side. A glass substrate can be used as the second substrate 2, similarly to the first substrate 1. The scanning wiring 8 and the signal wiring 11 are formed in different layers with the first insulating layer 10 therebetween. Further, the scanning wiring 8 and the signal wiring 11 are perpendicular to each other. The thin film transistor 12 is positioned near the intersection of the scanning wiring 8 with the signal wiring 11. The thin film transistor 12 has an inverted staggered structure. A gate electrode is connected to the scanning wiring 8; a source electrode is connected to the signal wiring 11; and a drain electrode is connected to the pixel electrode 4 through the first contact hole 17. A channel part of the thin film transistor 12 is formed of an amorphous silicon layer. The common wiring 9 is parallel to the scanning wiring 8 and it is connected to the common electrode 5 through the second contact hole 18.

The pixel electrode 4 has a comb-tooth shape in the entire pixel, and the comb tooth (projection part) is linearly formed. The pixel electrode has a rectangular slit 19 parallel to the scanning wiring 8. In contrast, the common electrode 5 has a comb-tooth shape in the reflective region R, but it is formed over the entire transmissive region T. Further, the common electrode 5 is positioned in a layer lower than the pixel electrode 4 with the third insulating layer 15 therebetween. The pixel electrode 4 and the common electrode 5 are transparent electrodes made of ITO (Indium Tin Oxide). The slit of the common electrode 5 has substantially the same shape as a shape of the slit of the pixel electrode 4. According to such a liquid crystal display device in Embodiment 1, a voltage is applied to the pixel electrode 4 and the common electrode 5, and thereby a horizontal electric field is generated in the liquid crystal layer 3, which brings a change in alignment in the liquid crystal layer 3. Thus, light which passes through the liquid crystal layer 3 is controlled.

The common wiring 9 protrudes to the display region side and reflects reflective light 20, as shown in FIG. 2. Transmissive light 21 from a backlight passes through the transmissive region T. According to Embodiment 1, the wirings such as the common wiring 9 are used as a reflector, which provides an effect of decreasing production steps. The common wiring 9 is formed of aluminum with a high reflectance, and thereby brighter reflective display is obtained. Instead of the common wiring 9, a reflector made of aluminum or a silver alloy, and the like, may be additionally formed. In Embodiment 1, as shown in FIG. 2, the transmissive region T and the reflective region R are arranged in such a way that a boundary between the transmissive region T and the reflective region R is parallel to the short side of the pixel in order to shorten the boundary.

According to Embodiment 1, the pixel electrode 4 and the common electrode 5 are formed of the same material between the transmissive region T and the reflective region R. However, the reflective region R has an IPS mode structure and the transmissive region T has a FFS mode structure. In such an embodiment, even if the pixel electrode 4 and the common electrode 5 are formed of the same material, a voltage which is applied to the liquid crystal layer 3 is different in intensity between the transmissive region T and the reflective region R. Accordingly, both of the reflective display and the transmissive display can be performed without providing the liquid crystal layer 3 with a multi-gap structure by additionally forming a step-forming layer in the reflective region R. The second alignment film 16 is further provided on the liquid crystal layer 3 side of the pixel electrode 4. The second alignment film 16 determines the alignment direction of the liquid crystal layer 3 near the second alignment film 16.

FIGS. 3, 4, and 5 each show an arrangement relationship among the polarizer, the retarder, and the liquid crystal molecule. FIG. 3 shows an arrangement relationship among the polarizer, the retarder, and the liquid crystal molecule under no voltage application. FIG. 4 shows an arrangement relationship among the polarizer, the retarder, and the liquid crystal molecule in the reflective region under voltage application. FIG. 5 shows an arrangement relationship among the polarizer, the retarder, and the liquid crystal molecule in the transmissive region under voltage application.

According to Embodiment 1, as shown in FIG. 2, the first polarizer 22 is arranged on the side opposite to the liquid crystal layer 3 of the first substrate 1, and the second polarizer 23 is arranged on the side opposite to the liquid crystal layer 3 of the second substrate 2. The first and second polarizers 22 and 23 are arranged in such a way that a transmission axis 26 of the first polarizer 22 is perpendicular to a transmission axis 27 of the second polarizer 23. The first retarder 24 is arranged between the first substrate 1 and the first polarizer 22. The second retarder 25 is arranged between the second substrate 2 and the second polarizer 23.

As shown in FIG. 3, the first retarder 24 has a retardation of ¼ wavelength, and the phase delay axis 28 is set to make an angle of 45° with the alignment direction of the liquid crystal molecule 30 in the clockwise direction. The transmission axis 26 of the first polarizer 22 is set to be parallel to the alignment direction of the liquid crystal molecule 30. The second retarder 25 has a retardation of ¼ wavelength. The second retarder 25 is arranged in such a way that the phase delay axis 29 is perpendicular to the phase delay axis 28 of the first retarder 24.

In the reflective region R, if a voltage of less than a threshold is applied to the pixel electrode 4 and the common electrode 5, a stacked body composed of the liquid crystal layer 3, the first polarizer 22 and the first retarder 24 functions as a circular polarizer. A linear polarized light which has passed through the first polarizer 22 is converted into a circularly-polarized light after passing through the first retarder 24. Then, the circularly-polarized light is reflected by the reflector and converted into a counter-rotating circularly-polarized light. When entering the first polarizer 22 again, the light is converted into a linear polarized light whose oscillation direction is vertical to the transmission axis 26 of the first polarizer 22. Therefore, the linear polarized light is absorbed by the first polarizer 22 and dark display is obtained. If a voltage more than a threshold is applied to the pixel electrode 4 and the common electrode 5, as shown in FIG. 4, the alignment of the liquid crystal molecule 30 is changed by a specific angle θ in the clockwise direction. As a result, incident light is reflected by the reflector 14, and then when entering the first polarizer 22 again, the light is converted into linear polarized light whose oscillation direction is parallel to the transmission axis of the first polarizer 22. Therefore, the light is not absorbed by the first polarizer 22 and bright display is obtained.

In the transmissive region T, the first retarder 24 is perpendicular to the second retarder 25. Therefore, a retardation in the normal direction of the first substrate 1 is zero, and the display in this direction is not influenced. If a voltage of less than a threshold is applied to the pixel electrode 4 and the common electrode 5, the long axis of the liquid crystal molecule 30 is perpendicular to the transmission axis 27 of the second polarizer 23. Therefore, the linear polarized light which has passed through the second polarizer 23 is a linear polarized light vertical to the transmission axis 26 of the first polarizer 22. Therefore, the light is absorbed by the first polarizer 22, and dark display is obtained. If a voltage of more than a threshold is applied to the pixel electrode 4 and the common electrode 5, as shown in FIG. 5, the alignment of the liquid crystal molecule 30 is changed by a specific angle 2θ in the clockwise direction. When entering the first polarizer 22, the light is converted into a linear polarized light whose oscillation direction is parallel to the transmission axis 26 of the first polarizer 22. Therefore, the light is not absorbed by the first polarizer 22, and bright display is obtained.

The first and second retarders 24 and 25 are made of a material which hardly shows wavelength dispersion of refractive index, for example, a norbornene material (product of JSR Corp., trade name: ARTON). In such a case, darker display which is less colored can be obtained.

Thus-prepared transflective liquid crystal display panel is connected to a driving device, and a backlight is arranged on the back face of the panel, for example. Thus, a transflective liquid crystal display device is completed.

A modified embodiment of Embodiment 1 is mentioned below.

According to the present embodiment, the comb tooth (projection part) of the pixel electrode 4 and the common electrode 5 may not have a linear shape shown in FIG. 1. For example, it may have a shape shown in FIGS. 6 to 11. According to the comb-tooth-shaped electrode 31 (either or both of the pixel electrode 4 and the common electrode 5) shown in FIG. 6, the comb tooth has a V shape which has one bent part at the middle of the comb tooth, like a broken line. The slit of the comb-tooth-shaped electrode 31 has a rectangular shape having one bent part. The comb tooth of the comb-tooth-shaped electrode 32 shown in FIG. 7 has two bent parts, like a broken line. The entire of the comb tooth has a substantially V shape. The slit of the comb-tooth-shaped electrode 32 has a rectangular shape having two bent parts. With regard to the comb-tooth-shaped electrode 33 shown in FIG. 8, the comb tooth has three bent parts, like a broken line. The entire of the comb tooth has a shape composed of two substantially V shapes. The slit of the comb-tooth-shaped electrode 33 has a rectangular shape having three bent parts, that is, a zig-zag shape. With regard to the comb-tooth-shaped electrode 34 shown in FIG. 9, the comb tooth has a circular-arc shape which has a curved part at the middle of the comb tooth. The slit of the comb-tooth-shaped electrode 34 also has a circular-arc shape. With regard to the comb-tooth-shaped electrode 35 shown in FIG. 10, the comb tooth has a circular-arc shape which has three curved parts. The entire of the comb tooth has a shape composed of two substantially V shapes. The slit of the comb-tooth-shaped electrode 35 has a meandering shape. The pixel electrode 4 may not have a comb-tooth shape and it may have a shape shown in FIG. 11, in which a rectangular slit 36 is entirely surrounded by the pixel electrode.

FIG. 12 is a schematic view showing the pixel electrode 4 and the common electrode 5 in Embodiment 1. FIG. 12(a) is a planar view schematically showing the pixel electrode 4 and the common electrode 5. FIGS. 12(b) and 12(c) are schematic views each showing a cross section taken along dashed line C-D in FIG. 12(a). As shown in FIG. 12(a), the pixel electrode 4 is formed to have a comb-tooth shape in both of the transmissive region T and the reflective region R. Further, the common electrode is formed to have a comb-tooth shape in the reflective region R, but it is formed over the entire transmissive region T. The arrangement relationship of the cross section between the pixel electrode 4 and the common electrode 5 is not especially limited to the embodiment in which the pixel electrode 4 is formed in a layer closer to the liquid crystal layer 3 than the common electrode 5, as shown in FIG. 12(b). As shown in FIG. 12(c), the common electrode 5 may be formed in a layer closer to the liquid crystal layer 3 than the common electrode 4.

Embodiment 2

Embodiment 2 shows a liquid crystal display device in accordance with one embodiment of the first display device of the present invention. FIG. 13 is a planar view schematically showing the pixel electrode 4 and the common electrode 5 constituting the liquid crystal display device in accordance with Embodiment 2. The liquid crystal display device in Embodiment 2 is the same as that in Embodiment 1, except that as shown in FIG. 13, the width of the slit of the pixel electrode 4 in the reflective region R is larger than that of the slit of the pixel electrode 4 in the transmissive region T. The intensity of the electric field generated between the pixel electrode 4 and the common electrode 5 can be decreased also by increasing a distance between the pixel electrode 4 and the common electrode 5. Therefore, if this embodiment is adopted in combination with the embodiment in which one pixel has both of the FFS mode structure and the IPS mode structure, the intensity of the electric field generated between the pixel electrode 4 and the common electrode 5 can be more effectively decreased in the reflective region R than that in the transmissive region T.

Embodiment 3

Embodiment 3 shows a liquid crystal display device in accordance with one embodiment of the first display device of the present invention. FIG. 14 is a schematic view showing the pixel electrode 4 and the common electrode 5 constituting the liquid crystal display device in accordance with Embodiment 3. FIG. 14(a) is a planar view schematically showing the pixel electrode 4 and the common electrode 5. FIG. 14(b) is a schematic view showing a cross section taken along dashed line E-F in FIG. 14(a). The liquid crystal display device in Embodiment 3 is the same as that in Embodiment 1, except that as shown in FIG. 14, the shield electrode 50 is arranged between the comb tooth of the pixel electrode 4 and the comb tooth of the common electrode 5 in the reflective region R. The shield electrode 50 is arranged in the reflective region R as shown in FIG. 14(a), and further arranged between the layer where the pixel electrode 4 is arranged and the layer where the common electrode 5 is arranged as shown in FIG. 14(b). Thus, the intensity of the electric field generated between the pixel electrode 4 and the common electrode 5 can be decreased also by arranging the shield electrode 50 between the pixel electrode 4 and the common electrode 5. Therefore, if this embodiment is adopted in combination with the embodiment in which one pixel has both of the FFS mode structure and the IPS mode structure, the intensity of the electric field generated between the pixel electrode 4 and the common electrode 5 can be more effectively decreased in the reflective region R than that in the transmissive region T. In addition, it is preferable that the shield electrode 50 is connected to ground.

Embodiment 4

Embodiment 4 shows a liquid crystal display device in accordance with one embodiment of the second display device of the present invention. FIG. 15 is a planar view schematically showing the pixel electrode 4 and the common electrode 5 constituting the liquid crystal display device in accordance with Embodiment 4. According to Embodiment 4, as shown in FIG. 15, the common electrode 5 is formed to have a comb-tooth shape in the entire pixel. Further, the pixel electrode 4 is formed to have a comb-tooth shape in the region R, but it is formed over the entire transmissive region T. That is, according to Embodiment 4, the structure of the pixel electrode 4 and the structure of the common electrode 5 may be counterchanged in the above-mentioned embodiments. Even in such an embodiment, the effects of the present invention can be exhibited because the FFS mode structure and the IPS mode structure are formed in one pixel.

The present application claims priority under the Paris Convention and the domestic law in the country to be entered into national phase on Patent Application No. 2006-199667 filed in Japan on Jul. 21, 2006, the entire contents of which are hereby incorporated by reference.

The term "or more" in the present description means that the value described (boundary value) is included.

BRIEF DESCRIPTION OF DRAWINGS

FIG. 12(a) shows a schematic planar view. FIGS. 12(b) and 12(c) are schematic views each showing a cross section taken along dashed line C-D in FIG. 12(a).

FIG. 14(a) is a schematic planar view. FIG. 14(*b*) is a schematic view showing a cross section taken along dashed line E-F in FIG. 14(*a*).

EXPLANATION OF NUMERALS AND SYMBOLS

Figure 1:
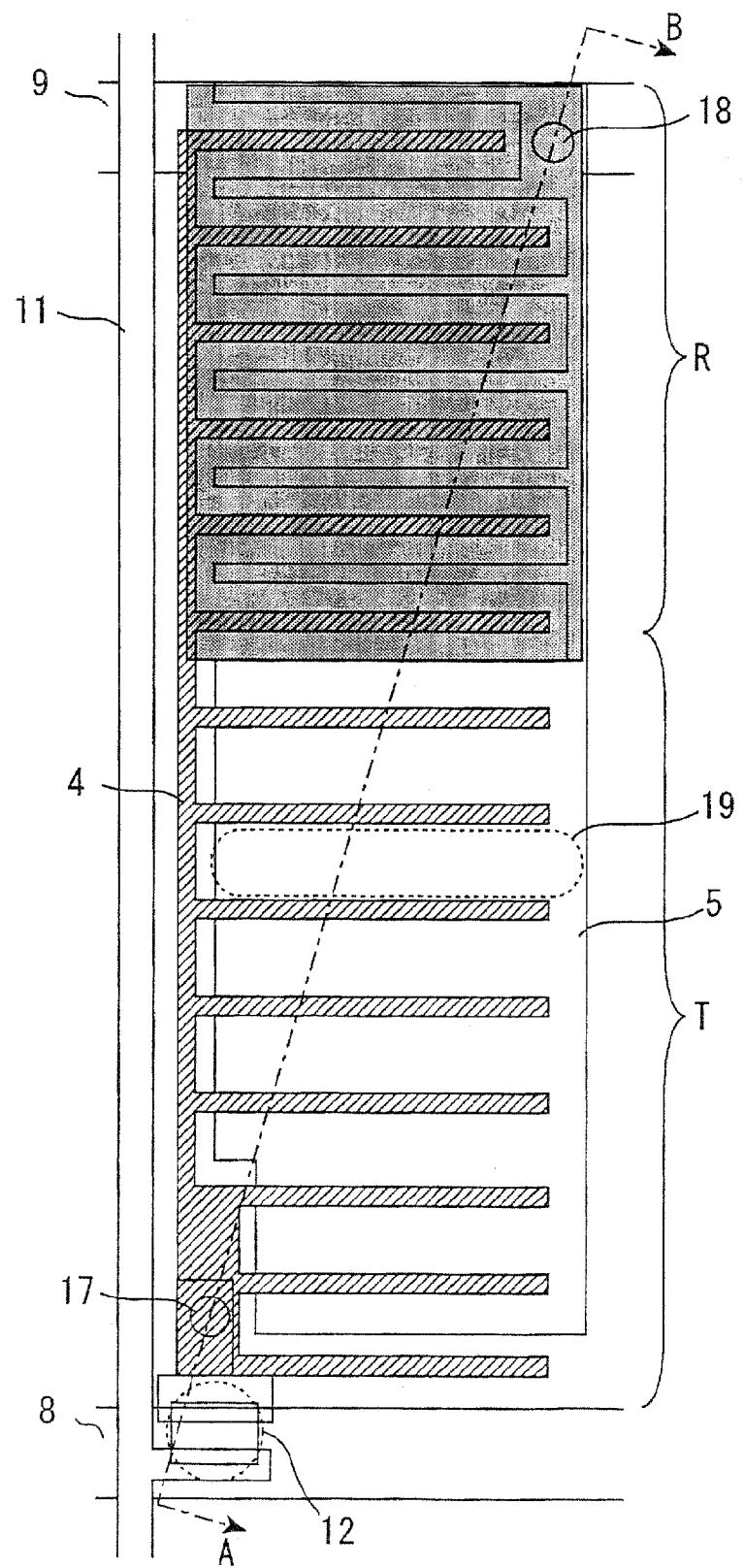
FIG. 1 is a planar view schematically showing one pixel constituting the liquid crystal display device in accordance with Embodiment 1.
Figure 2:
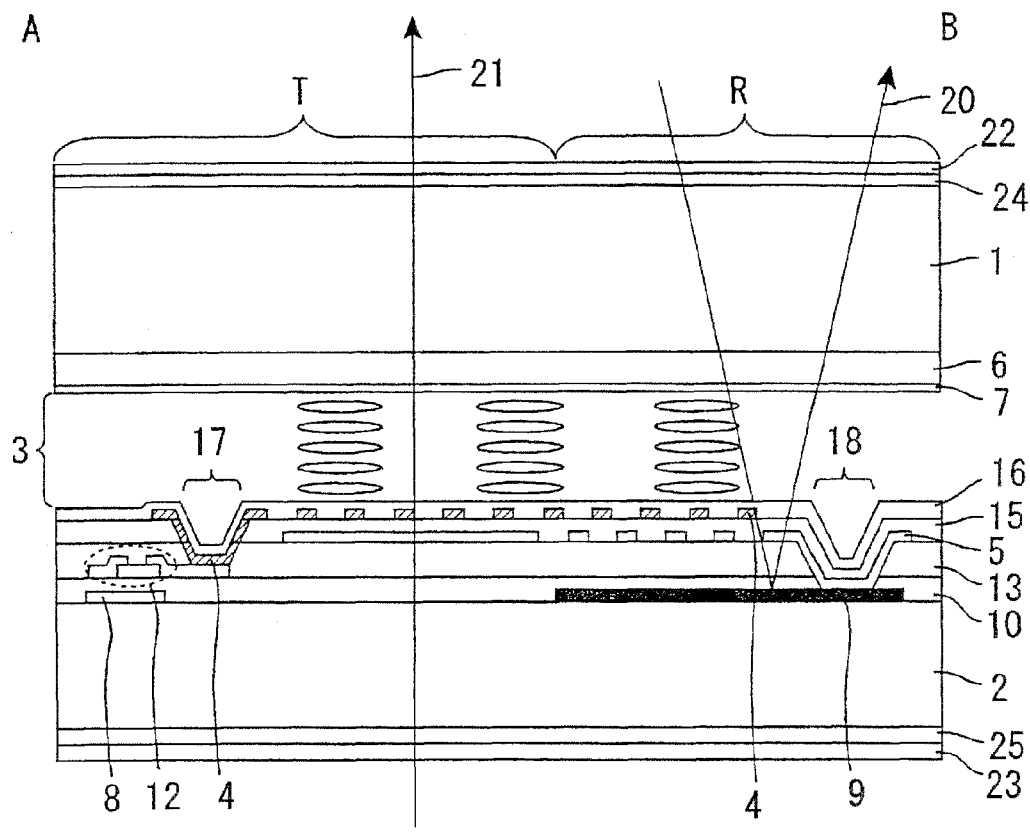
FIG. 2 is a schematic view showing a cross section taken along dashed line A-B shown in FIG. 1.
Figure 3:
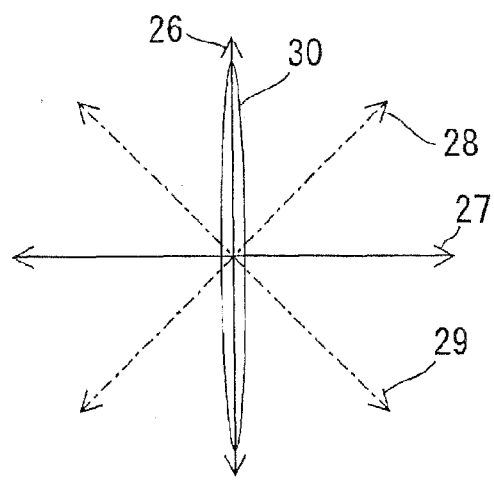
FIG. 3 is a schematic view showing arrangement relationship among the polarizer, the retarder, and the liquid crystal molecule during no voltage application in accordance with Embodiment 1.
Figure 4:
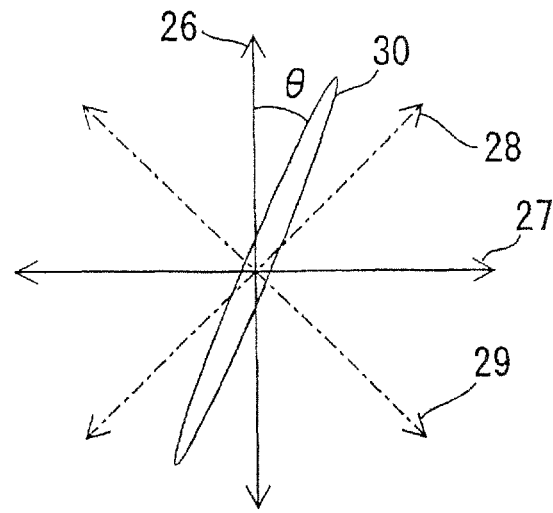
FIG. 4 is a schematic view showing arrangement relationship among the polarizer, the retarder, and the liquid crystal molecule in the reflective region during voltage application in accordance with Embodiment 1.
Figure 5:
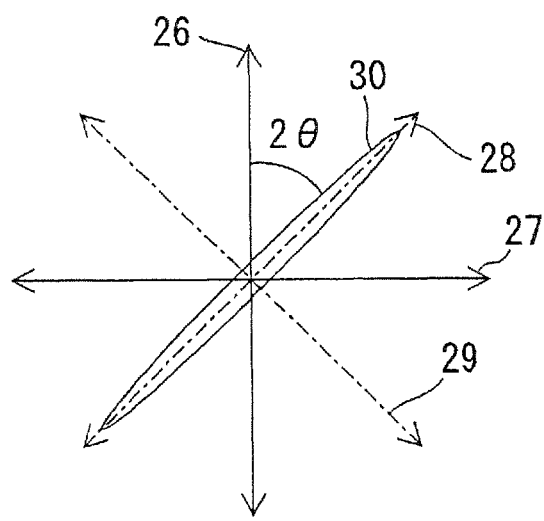
FIG. 5 is a schematic view showing arrangement relationship among the polarizer, the retarder, and the liquid crystal molecule in the transmissive region during voltage application in accordance with Embodiment 1.
Figure 6:
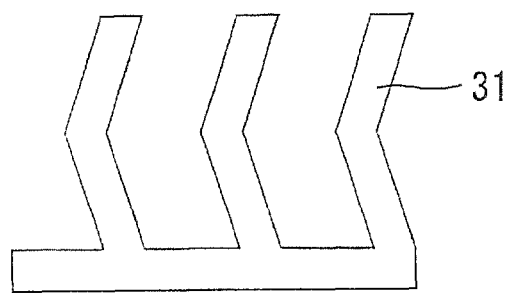
FIG. 6 is a planar view schematically showing electrodes (the pixel electrode and the common electrode) in accordance with a modified embodiment (the rectangular slit has one bent part) of Embodiment 1.
Figure 7:
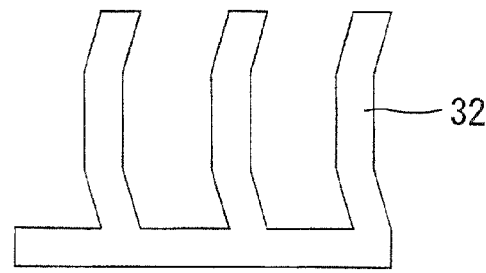
FIG. 7 is a planar view schematically showing electrodes (the pixel electrode and the common electrode) in accordance with a modified embodiment (the rectangular slit has two bent parts) of Embodiment 1.
Figure 8:
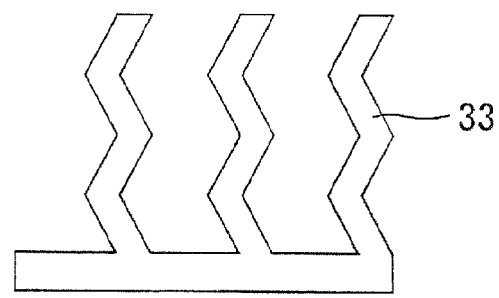
FIG. 8 is a planar view schematically showing electrodes (the pixel electrode and the common electrode) in accordance with a modified embodiment (the rectangular slit has three bent parts) of Embodiment 1.
Figure 9:
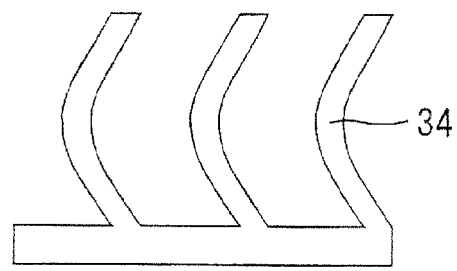
FIG. 9 is a planar view schematically showing electrodes (the pixel electrode and the common electrode) in accordance with a modified embodiment (the slit has a circular arc shape) of Embodiment 1.
Figure 10:
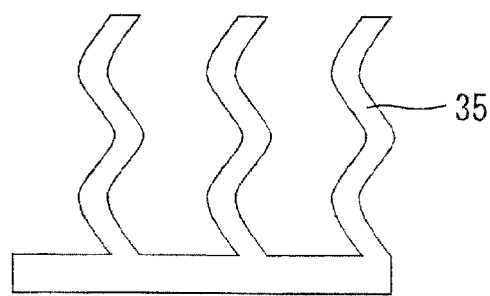
FIG. 10 is a planar view schematically showing electrodes (the pixel electrode and the common electrode) in accordance with a modified embodiment (the slit has a meandering shape) of Embodiment 1.
Figure 11:
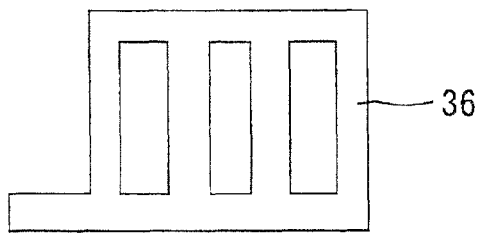
FIG. 11 is a planar view schematically showing electrodes (the pixel electrode and the common electrode) in accordance with a modified embodiment (the slit is entirely surrounded by the electrodes) of Embodiment 1.
Figure 12:
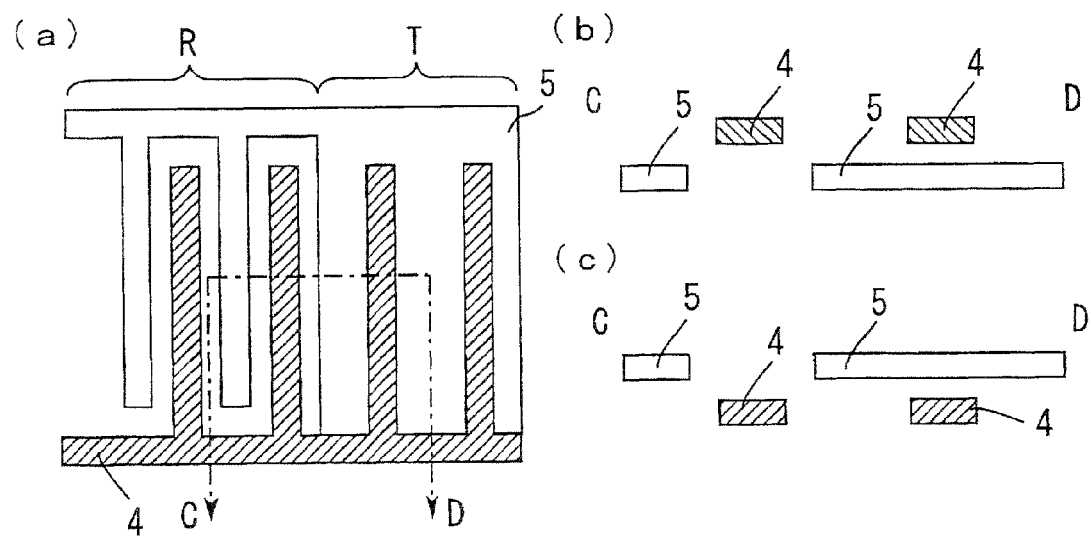
FIG. 12 is a schematic view showing the pixel electrode and the common electrode (the slit has a rectangular shape) in accordance with Embodiment 1.
Figure 13:
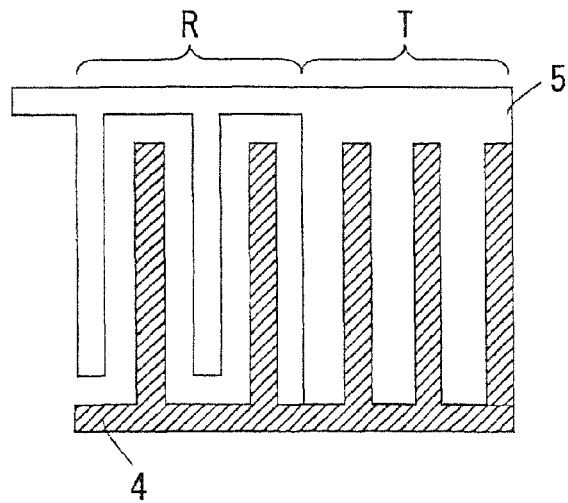
FIG. 13 is a planar view schematically showing the pixel electrode and the common electrode constituting the liquid crystal display device in accordance with Embodiment 2.
Figure 14:
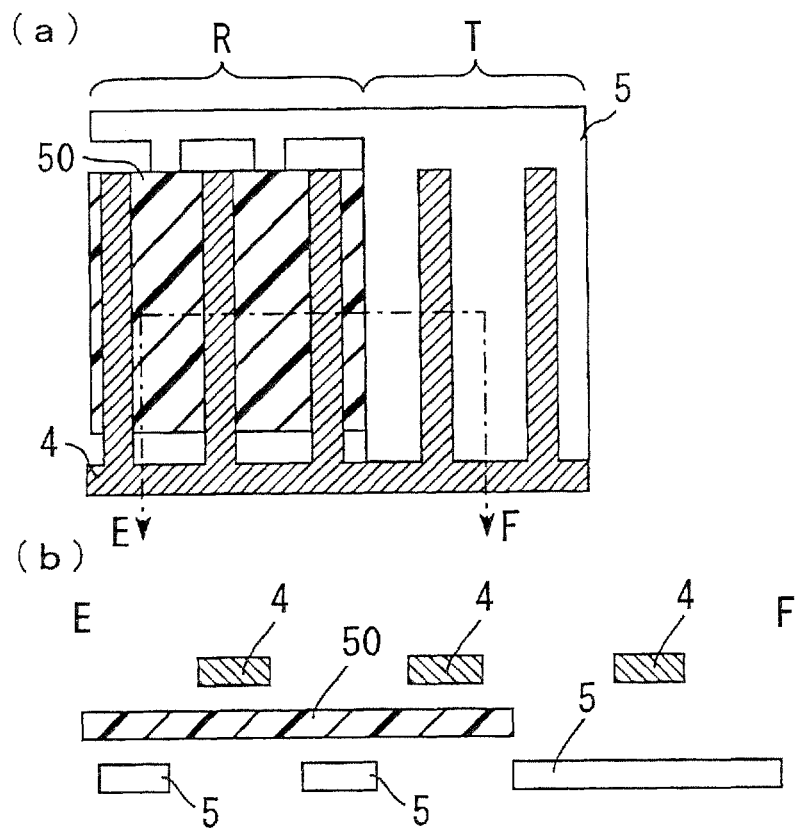
FIG. 14 is a schematic view showing the pixel electrode and the common electrode constituting the liquid crystal display device in accordance with Embodiment 3.
Figure 15:
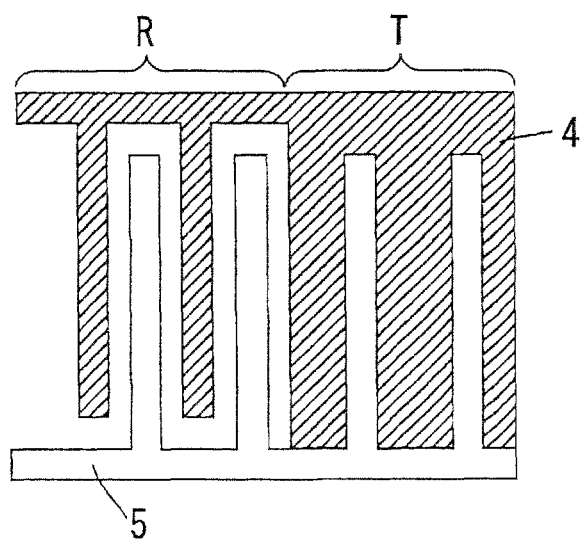
FIG. 15 is a planar view schematically showing the pixel electrode and the common electrode constituting the liquid crystal display device in accordance with Embodiment 4.

1: The first substrate
2: The second substrate
3: Liquid crystal layer
4: Pixel electrode
5: Common electrode
6: Color filter layer
7: The first alignment film
8: Scanning wiring
9: Common wiring (reflector)
10: The first insulating layer
11: Signal wiring
12: Thin film transistor
13: The second insulating layer
15: The third insulating layer
16: The second alignment film
17: The first contact hole
18: The second contact hole
19: Slit
20: Reflective light
21: Transmissive light
22: The first polarizer
23: The second polarizer
24: The first retarder
25: The second retarder
26: Transmission axis of the first polarizer
27: Transmission axis of the second polarizer
28: Phase delay axis of the first retarder
29: Phase delay axis of the second retarder
30: Liquid crystal molecule
31: Comb-tooth-shaped electrode (the rectangular slit has one bent part)
32: Comb-tooth-shaped electrode (the rectangular slit has two bent parts)
33: Comb-tooth-shaped electrode (the rectangular slit has three bent parts)
34: Comb-tooth-shaped electrode (the slit has a circular arc shape)
35: Comb-tooth-shaped electrode (the slit has a meandering shape)
36: Electrode (the slit is entirely surrounded by the electrode)
50: Shield electrode
T: Transmissive region
R: Reflective region

The invention claimed is:

1. A display device comprising:
a pair of substrates; a display medium interposed between the pair of substrates; and a pixel having a reflective region for performing reflective display and a transmissive region for performing transmissive display,
wherein the display device includes a pixel electrode and a common electrode on one of the pair of substrates,
a voltage is applied to the display medium through the pixel electrode and the common electrode,
each of the pixel electrode and the common electrode is provided with a slit,
the common electrode is provided with the slit in the reflective region and the transmissive region, and
the pixel electrode comprises a first portion in the reflective region and a second portion in the transmissive region, wherein the first portion of the pixel electrode in the reflective region comprises a plurality of slits defined in the pixel electrode, and the second portion of the pixel electrode in the transmissive region does not include a plurality of slits defined therein, so that the pixel electrode does not include a plurality of slits in the tranmissive region of the pixel.

2. The display device according to claim 1, wherein the pixel electrode is formed over the entire transmissive region.

3. The display device according to claim 1, wherein the pixel electrode has a comb-tooth shape in the reflective region.

4. The display device according to claim 1, wherein the slit of the pixel electrode is entirely surrounded by the common electrode.

5. The display device according to claim 1, wherein the slit of the pixel electrode has a rectangular shape.

6. The display device according to claim 1, wherein the slit of the pixel electrode has a rectangular shape having at least one bent part.

7. The display device according to claim 1, wherein the slit of the pixel electrode has a zig-zag shape.

8. The display device according to claim 1, wherein the slit of the pixel electrode has a circular arc shape.

9. The display device according to claim 1, wherein the slit of the pixel electrode has a meandering shape.

10. The display device according to claim 1, wherein the common electrode has a comb-tooth shape.

11. The display device according to claim 1, wherein the slit of the common electrode is entirely surrounded by the common electrode.

12. The display device according to claim 1, wherein the slit of the common electrode has a rectangular shape.

13. The display device according to claim 1, wherein the slit of the common electrode has a rectangular shape having at least one bent part.

14. The display device according to claim 1, wherein the slit of the common electrode has a zig-zag shape.

15. The display device according to claim 1, wherein the slit of the common electrode has a circular arc shape.

16. The display device according to claim 1, wherein the slit of the common electrode has a meandering shape.

17. The display device according to claim 1, wherein the slit of the common electrode has substantially the same shape as a shape of the slit of the pixel electrode.

18. The display device according to claim 1, wherein a width of the slit of the common electrode in the reflective region is larger than a width of the slit of the common electrode in the transmissive region.

19. The display device according to claim 1, wherein a shield electrode is arranged between the pixel electrode and the common electrode in the reflective region.

20. The display device according to claim 19, wherein the shield electrode is connected to ground.

* * * * *